Patented Mar. 7, 1950

2,499,702

UNITED STATES PATENT OFFICE 2,499,702

PROCESS FOR THE PREPARATION OF 2-PHENYLANTHRAQUINONE

Robert R. Umhoefer, Kenmore, N. Y., assignor to Buffalo Electro-Chemical Company, Inc., Tonawanda, N. Y.

No Drawing. Application March 14, 1947, Serial No. 734,851

5 Claims. (Cl. 260—369)

This invention relates to the preparation of 2-phenylanthraquinone, a product useful in the preparation of dyestuffs and also as an intermediate in the cyclic reduction and oxidation process for the production of hydrogen peroxide.

According to the present invention this compound is prepared by reacting 2-(4-phenylbenzoyl)-benzoic acid with concentrated sulfuric acid to produce a sulfonic acid of 2-phenylanthraquinone. The sulfonic acid group is then removed by hdyrolysis in the presence of mineral acids at 200–300° C. to form 2-phenylanthraquinone. The invention is carried out in its simplest manner by using dilute sulfuric acid as the hydrolyzing medium. In accordance with the present invention the sulfonic acid of 2-phenylanthraquinone is prepared using concentrated sulfuric acid and the mixture is then diluted with water and heated under pressure to effect a removal of the sulfonic acid group. Compounds of heavy metals such as copper and mercury may be used as a catalyst to facilitate the hydrolysis.

The sulfonic acid of 2-phenylanthraquinone or its salts is also hydrolyzable by acidic media generally as, for instance, by dilute phosphoric or hydrochloric acid, at 200–300° C. under high pressure, or with concentrated phosphoric acid at 200–300° C. at atmospheric pressure.

The following examples are illustrative of the process and are not to be deemed limitative thereof.

Example I

A solution of 20 g. of 2-(4-phenylbenzoyl)-benzoic acid in 100 g. of 95% surfuric acid was heated at 125° C for 2 hours. The mixture was cooled and diluted with 250 g. of water and 0.5 g. of mercuric sulfate added. The mixture was placed in a one-liter autoclave and heated until the pressure rose to 550 pounds gage and this pressure was maintained for 29 hours. The product was dissolved in benzene and washed several times with dilute alkali and then treated with activated alumina until colored impurities were removed. Evaporation of the benzene solution yielded 9.7 g. (52% of the theoretical) of yellow 2-phenylanthraquinone which melted at 158–159° C.

Potassium 2-phenylanthraquinone sulfonate may be prepared by reacting 1 part of 2-(phenylbenzoyl)-benzoic acid with 5 parts of 95% sulfuric acid at 125° C. for 2 hours, cooling, diluting the mixture with 5 parts of water and removing the precipitated sulfonic acid by filtration. The sulfonic acid is converted to the potassium salt by recrystallizing from water which contains potassium carbonate in slight excess of that required to neutralize the acid.

Example II

A mixture of 10 g. of potassium 2-phenylanthraquinone sulfonate prepared as in Example I, and 100 g. of water and 100 cc. of concentrated hydrochloric acid was heated in an autoclave at 550 pounds gage pressure of 17 hours. The product was worked up as in Example I to yield 4.5 g. (64%) of 2-phenylanthraquinone, melting point 160–161° C.

Example III

A mixture of 14 g. of potassium 2-phenylanthraquinone sulfonate prepared as in Example I, and 120 g. of phosphoric acid (85%) and 80 g. of water were placed in an autoclave and heated at 550 pounds gage pressure for 24 hours. After the crude product was worked up as in Example I, a yield of 4.3 g. or 44% of the theoretical of 2-phenylanthraquinone was obtained which melted at 160–161° C.

Example IV

A mixture of 5 g. of potassium 2-phenylanthraquinone sulfonate and 50° cc. of 85% phosphoric acid were placed in a flask equipped with a downward condenser. The mixture was heated over a period of 4 hours to a bath temperature of 260° C. and held at 260° C. for 16 hours. After this time, some of the 2-phenylanthraquinone had sublimed into the condenser and a cake of brown-yellow 2-phenylanthraquinone had formed in the neck of the flask. The product was dissolved in benzene, filtered, washed with dilute alkali and the benzene evaporated. The crude product was reddish-yellow in color and weighed 2.6 g., melting point 157–158° C. The crude product was purified by dissolving in benzene and passing the solution through a column of activated alumina. The bright yellow filtrate, after evaporation, yielded 2.5 g. (71%) of light yellow 2-phenylanthraquinone, melting point 161–162° C.

What is claimed is:

1. A process for the preparation of 2-phenylanthraquinone comprising the formation of the sulfonic acid of 2-phenylanthraquinone by the action of concentrated sulfuric acid on 2-(4-phenylbenzoyl)-benzoic acid, and hydrolyzing off the sulfonic acid group in the presence of an aqueous solution of a mineral acid at a temperature of 200 to 300° C.

2. A process according to claim 1 wherein the hydrolysis is effected by autoclaving.

3. A process in accordance with claim 1 wherein the hydrolysis is effected in the presence of sulfuric acid.

4. A process in accordance with claim 1 wherein the hydrolysis is effected in the presence of hydrochloric acid.

5. A process in accordance with claim 1 wherein the hydrolysis is effected in the presence of phosphoric acid.

ROBERT R. UMHOEFER.

REFERENCES CITED

The following references are of record in the file of this patent:

FOREIGN PATENTS

| Number | Country | Date |
|---|---|---|
| 160,104 | Germany | Apr. 25, 1905 |

OTHER REFERENCES

Scholl et al., "Ber. deutsch chem. Ges.," vol. 44 (1911), pages 1075-1090.

Kaiser, "Liebigs Annalen der Chem.," vol. 257 (1890), pages 95-97.

Houben, "Das Anthracen und die Anthrachinone," (1929), page 237, also pages 297-298.